FLAT-COPY SCANNER

Filed Oct. 29, 1957

Inventors:
Neal A. Blake,
Kenneth N. Fromm
by Lust & Irish
Attorneys.

United States Patent Office 2,967,906

Patented Jan. 10, 1961

2,967,906

FLAT-COPY SCANNER

Neal A. Blake, Fort Wayne, Ind., and Kenneth N. Fromm, Cincinnati, Ohio, assignors to International Telephone and Telegraph Corporation Filed Oct. 29, 1957, Ser. No. 693,175

11 Claims. (Cl. 178—7.1)

This invention relates to facsimile transmission systems, and more particularly to flat-copy scanning apparatus for such systems.

Facsimile systems are utilized for transmitting such material as weather maps and photographs where transmission times considerably slower than the virtually instantaneous transmission provided by television are acceptable. In the past, rotating scanning discs having a plurality of spirally arranged apertures have been used for scanning the copy in facsimile transmission systems, the apertures scanning across the page or sheet along successively transverse scanning elements or lines. It has, however, been difficult to precision etch or otherwise form such spiral apertures and thus the difficulties of manufacture have resulted in high cost of the scanning spirals used in existing high definition facsimile equipment. Furthermore, while it is desirable that the scanning apertures be square in shape throughout the entire length of each scanning line, when one or more spiral rotating apertures and one or more fixed apertures or slots are employed, the resulting scanning aperture is neither square nor constant over the entire length of each scanned line. In addition, the prior rotating disc scanning apparatus is large and bulky and the high speed rotating disc is hazardous.

It is therefore desirable to provide a scanning apparatus for facsimile transmission systems which eliminates the prior rotating scanning discs with their spiral rotating scanning apertures. Scanning apparatus employing an endless tape with the scanning apertures spaced-apart thereon is disclosed in our co-pending application Serial No. 556,686, filed December 30, 1955, and assigned to the assignee of the present application. In that application, there is described a flat-copy scanner having an endless tape with a first series of spaced-apart light apertures formed thereon, the tape being continuously moved lengthwise of a light slot which exposes a line element of the copy, the moving light apertures on the tape thus successively scanning line increments of the copy which may be moved transversely of the light slot. The light passed by the light apertures in the tape is directed onto a photosensitive device for ultimate transmission in the facsimile system. The endless tape also includes a second series of spaced-apart light apertures which in combination with a light source and another photosensitive device sample the linear speed of the tape. This tape speed signal, together with a signal responsive to the speed of the copy drive is compared with a standard frequency source to provide error signals for controlling the tape and copy feed drives respectively.

In the design of facsimile scanning apparatus, it is desirable to incorporate means for providing a blanking pulse at the end of each scanned line; the blanking pulse informs the receiving equipment that the scanning of one line has been completed and initiates movement of the received copy into position for receiving the next scanned line. In accordance with our present invention, the endless tape scanning apparatus of our aforesaid application Serial No. 556,686 is utilized to provide a blanking pulse by spacing the scanning light apertures apart a distance greater than the width of the light slot so that at the end of each line element scanning operation, there will be an interval in which no scanning light aperture is exposed to the slot; during this interval no light is passed from the copy to the photosensitive device. In order to utilize this interval for providing a blanking pulse, a light source is arranged having an aperture which comes into registry with one of the scanning light apertures during the interval when no one of the scanning light apertures is exposed to the light slot, this light source during that interval directs the light through its aperture and the cooperating scanning light aperture onto the photosensitive device to provide a blanking pulse.

It is therefore an object of this invention to provide improved flat-copy scanning apparatus.

Another object of this invention is to provide improved flat-copy scanning apparatus employing an endless tape with light apertures formed therein for scanning.

A further object of this invention is to provide improved means for providing a blanking pulse in flat-copy scanning apparatus.

Yet another object of this invention is to provide improved means for providing a blanking pulse in flat-copy scanning apparatus of the endless-tape type.

The above mentioned and other features and objects of this invention and the manner of attaining them will become more apparent and the invention itself will be best understood by reference to the following description of an embodiment of the invention taken in conjunction with the accompanying drawings, wherein.

Figures 1, 2, 3:
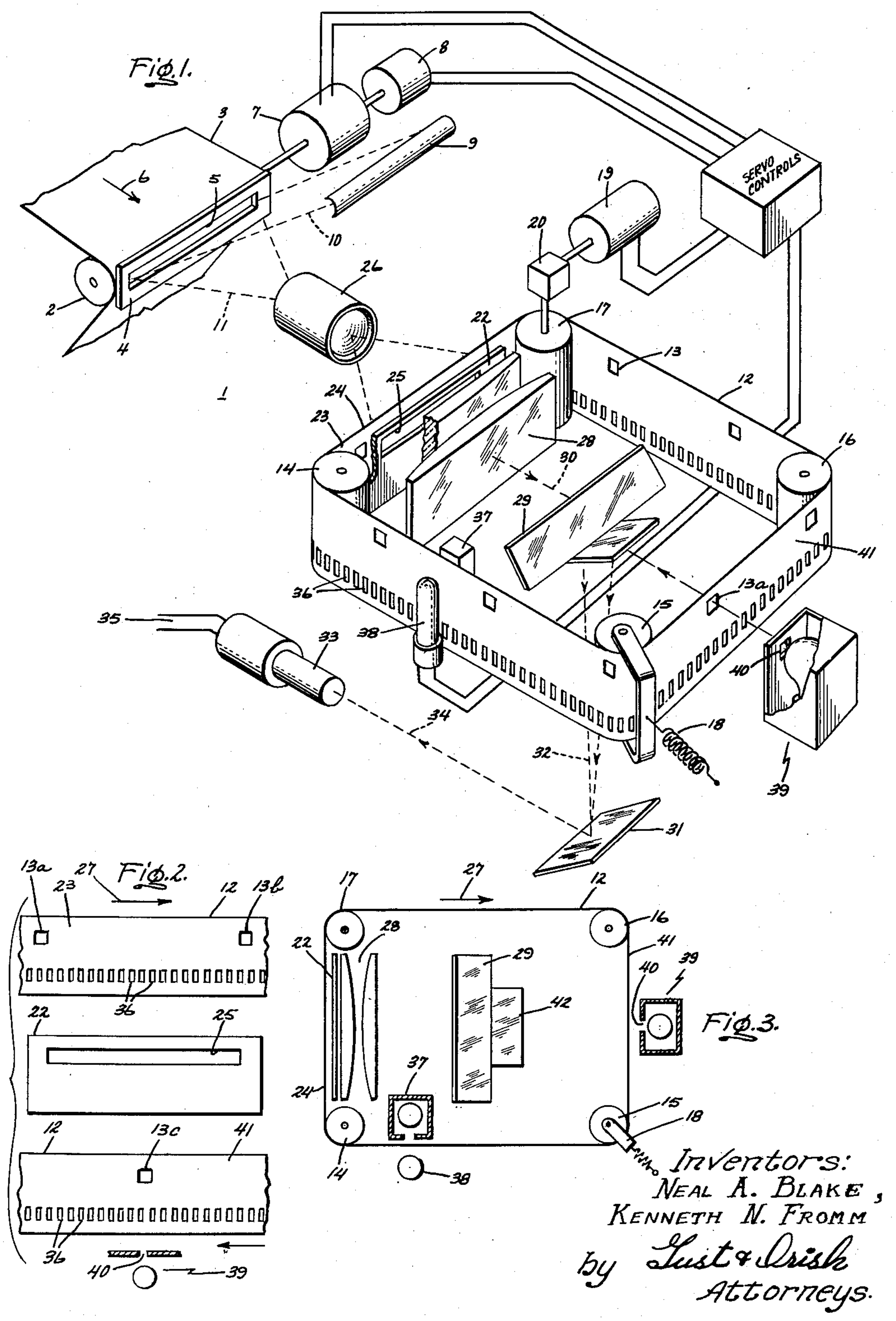
Fig. 1 is a diagrammatic view in perspective, partially broken away, illustrating the principal elements of our invention.
Fig. 2 is a diagrammatic top view, partly in section, further illustrating the scanning apparatus of Fig. 1.
Fig. 3 is a fragmentary diagrammatic view illustrating the relationship of the scanning light apertures, height defining slot, and effective blanking light aperture of the apparatus of Fig. 1.

Referring now to the drawing, our improved flat-copy scanning apparatus, generally identified as 1, includes a copy feed roller 2 over which the copy 3 to be transmitted is passed. Disposed in front of the copy 3 as it passes over copy feed roller 2 is a plate 4 having an elongated light slot 5 formed therein which exposes a line element of the copy 3 for scanning, as will hereinafter be more fully described. The copy 3 is driven transversely of the slot 5 in the direction shown by the arrow 6 by means of a suitable driving motor 7 having a speed-sensing tachometer generator 8 connected thereto.

An elongated light source 9 is provided which directs light, as at 10, through the elongated slot 5 and onto the line element of the copy 3 exposed thereby, the light being reflected from the line element of the copy back through the slot 5, as at 11. An endless tape 12, which may be formed of relatively thin metal, has a plurality of spaced-apart light apertures 13 formed therearound in a line, as shown; the light apertures may be etched or otherwise conventionally formed in the metal tape 12. Endless tape 12 is carried by rollers 14, 15 and 16 and is driven by a capstan 17, roller 15 diagonally opposite from capstan 17 having a spring tape tensioning device 18 as shown. Capstan 17 is driven by a suitable motor 19 through a gear box 20. A height defining aperture plate 22 is closely spaced from the inner side 23 of the run 24 of the tape 12 which is exposed to the light 11 projected from the copy 3 through slot 5. Height defining aperture plate 22 has an elongated slot 25 formed therein as shown. The light 11 projected from copy 3 through slot 5 is focused onto the run 24 of the endless tape 12 by a suitable lens system 26, it being readily understood that the particular focusing and optical system employed for projecting the light 11 upon the tape 12 does not form a part of this invention and that a folded optical system or any other conventional optical system may be employed.

The motor 19 drives the tape 12, for example, in the direction shown by the arrow 27, and it will be seen that the scanning light apertures 13 which are aligned with the elongated slot 25, move lengthwise of the slot 25 thereby scanning the beam of light 11 from the line element of the copy 3. The incremental element of light scanned by the effective light aperture 13 is passed through the elongated slot 25 and through a suitable condensing lens system 28 within the tape 12 onto inclined mirror 29, as at 30. Mirror 29, which is also within tape 12, reflects the light passed by the effective light aperture 13 and the elongated slot 25 downwardly onto mirror 31, as at 32, the mirror 31 being disposed outside of the tape 12. Mirror 31 in turn reflects the light onto photosensitive device 33, as at 34; the device 33 may be a photomultiplier tube connected by suitable leads 35 to a facsimile transmitter (not shown).

As more fully described in our aforesaid application Serial No. 556,686, in order to synchronize the speed of the endless tape 12 with that of the copy-drive motor 7, another closely spaced series of light apertures 36 is formed around the endless tape 12. A light source 37 is provided on one side of the tape 12 cooperating with the synchronizing light aperture 36 and a photosensitive device 38, such as a photocell, to provide a signal responsive to the tape speed. The tape speed signal from the photosensitive device 38, together with the copy speed drive signal from the tachometer 8 is compared with a standard frequency and utilized to derive appropriate error signals therefrom for operating the tape drive motor 19 and copy drive motor 7 at the proper speeds.

In order to provide a blanking pulse at the end of each scanning line, another light source 39 is provided outside of the endless tape 12 and having a light aperture 40 formed therein facing the outer side of run 41 of the endless tape 12, shown here as being diametrically opposite from the scanning run 24. Referring now particularly to Fig. 3, the light scanning apertures 13 of tape 12 are spaced apart a distance greater than the length of the elongated slot 25 in height defining aperture plate 22; in an actual design of this apparatus, the spacing between the adjacent light scanning apertures 13 was 5.263% greater than the length of the slot 25. It will thus be seen that after a given light scanning aperture 13*a* has passed out of registry with slot 25, there will be an interval of time before the adjacent light scanning aperture 13*b* comes into registry with slot 25. In order to utilize this interval for providing a blanking pulse, the light source 39 and its aperture 40 are arranged so that they come into registry with a light scanning aperture 13*c* during the interval when no light scanning aperture 13 is exposed to the slot 25. Light from the light source 39 therefore passes through apertures 40 and 13*c*, as at 41, onto mirror 42 within the endless tape 12. Mirror 42 reflects the light from the light source 39 onto mirror 31, as at 43, mirror 31 again reflecting the light onto the photosentitive device 33 for providing a blanking pulse. The blanking aperture 40 of the light source 39 preferably has the same width as the difference between the spacing of the light scanning apertures 13 of tape 12 and the length of slot 25 and thus in an actual design of this equipment, the blanking pulse aperture 40 has a length 5.263% of the length of the slot 25.

It will also be observed that the light scanning apertures 13 are rectangular in configuration and preferably have their widths respectively the same as the height of the height defining slot 25; this insures that the effective aperture performing the scanning is square in configuration regardless of slight up and down movement of the tape 12 on the rollers 14, 15 and 16 and the capstan 17.

It will now be seen that we have provided a flat-copy scanner employing an endless tape and having extremely simple and foolproof means for providing blanking pulses, which utilizes the same light sensitive device for the blanking signal pickup as is used for the regular scanning signal.

While we have described above the principles of our invention in connection with specific apparatus, it is to be clearly understood that this description is made only by way of example and not as a limitation to the scope of our invention.

What is claimed is:

1. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having an elongated light slot formed therein arranged on one side of said tape, said slot being aligned with the line of said light apertures; means for moving said tape lengthwise of said slot whereby said apertures successively scan said line element; photosenstive means arranged to receive light from said apertures and slot during each scanning of said line element and to provide a signal in response thereto; said apertures being spaced-apart a distance greater than the length of said slot; and means arranged to direct light through one of said apertures and onto said photosensitive means when no aperture is scanning said line element for providing a blanking pulse.

2. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having an elongated light slot formed therein arranged on one side of said tape, said slot being aligned with the line of said light apertures; means for moving said tape lengthwise of said slot whereby said apertures successively scan said line element; photosensitive means for providing a signal responsive to light from said apertures and slot; an optical system for directing light from said aperture and slot onto said photosensitive means during each scanning of said line element; said apertures being spaced-apart a distance greater than the length of said slot; a source of light arranged to be in registry with one of said apertures when no aperture is scanning said line element; and another optical system for directing light from said one aperture onto said photosensitive means thereby providing a blanking pulse.

3. In a flat copy scanning system for facsimile transmission: means for supporting the copy to be scanned; means for directing light onto a transverse line element of said copy; an endless tape spaced from said copy and having a plurality of evenly spaced-apart light apertures therearound; means having an elongated light slot formed therein arranged on one side of said tape, said slot being aligned with the line of said light apertures; an optical system for directing light from said line element onto said slot and tape; means for moving said tape lengthwise of said slot whereby said apertures successively scan said line element; photosensitive means arranged to receive light from said apertures and slot during each scanning of said line element and to provide a signal in response thereto; said apertures being spaced-apart a distance greater than the length of said slot; and means arranged to direct light through one of said apertures and onto said photosensitive means when no aperture is scanning said line element for providing a blanking pulse.

4. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having an elongated light slot formed therein arranged on one side of said tape, said slot being aligned with the line of said light apertures; means for moving said copy transversely of said slot; means for moving said tape lengthwise of said slot whereby said apertures successively scan said line element; photosensitive means arranged to receive light from said apertures and slot during each scanning of said line element and to provide a signal in response thereto; said apertures being spaced-apart a distance greater than the length of said slot; and means arranged to direct light through one of said apertures and onto said photosensitive means when no aperture is scanning said line element for providing a blanking pulse.

5. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having an elongated light slot formed therein arranged on one side of said tape, said slot being aligned with the line of said light apertures; means for moving said tape lengthwise of said slot whereby said apertures successively scan said line element; said apertures being rectangular and having the same width as the height of said slot whereby the portion of each aperture performing said scanning is substantially square; photosensitive means arranged to receive light from said apertures and slot during each scanning of said line element and to provide a signal in response thereto; said apertures being spaced-apart a distance greater than the length of said slot; and means arranged to direct light through one of said apertures and onto said photosensitive means when no aperture is scanning said line element for providing a blanking pulse.

6. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; a plate having an elongated light slot formed therein closely spaced from said tape on the side thereof remote from said copy, said slot being aligned with the line of said light apertures; means for moving said tape lengthwise of said slot whereby said apertures successively scan said line element; photosensitive means arranged to receive light from said apertures and slot during each scanning of said line element and to provide a signal in response thereto; said apertures being spaced-apart a distance greater than the length of said slot; and means arranged to direct light through one of said apertures and onto said photosensitive means when no aperture is scanning said line element for providing a blanking pulse.

7. In a flat copy scanning system for facsimile transmission: means for supporting the copy to be scanned; a flat plate arranged on one side of the copy and having an elongated slot formed therein for exposing a transverse line element of said copy; a light source arranged to direct light onto said line element so that said light is reflected through said slot; an endless tape spaced from said plate for receiving light from said line element and having a plurality of evenly spaced-apart light apertures therearound; another plate having an elongated light slot formed therein closely spaced from said tape on the side thereof remote from said first plate; said last-named slot being aligned with the line of said light apertures; means for moving said tape lengthwise of said last-named slot whereby said apertures successively scan said line element; photosensitive means arranged to receive light from said apertures and said last-named slot during each scanning of said line element and to provide a signal in response thereto; said apertures being spaced-apart a distance greater than the length of said last-named slot; and means arranged to direct light through one of said apertures and onto said photosensitive means when no aperture is exposed to said last named slot for providing a blanking pulse.

8. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having a elongated light slot formed therein arranged on one side of said tape, said slot being aligned with the line of said light apertures; means for moving said tape lengthwise of said slot whereby said apertures successively scan said line element; photosensitive means arranged to receive light from said apertures and slot during each scanning of said line element and to provide a signal in response thereto; said apertures being spaced-apart a distance greater than the length of said slot; a light source disposed on the exterior of said tape and remote from said slot, said light source having an aperture in registry with one of said light apertures of said tape when no one of said light apertures is exposed to said slot; and means for directing light passed by said one aperture from said light source to said photosensitive means for providing a blanking pulse.

9. In a flat copy scanning system for facsimile transmission: means for supporting the copy to be scanned; means for directing light onto a transverse line element of said copy; an endless tape supported on a plurality of rollers, said tape having one run parallel with said line element and spaced therefrom for receiving light from said line element, said tape having a plurality of evenly spaced-apart light apertures arranged on a line thereаround; a plate having an elongated light slot formed therein arranged within said tape and closely spaced from said one run, said slot being aligned with said line of said light apertures; means for driving at least one of said rollers to move said tape lengthwise of said slot whereby said apertures successively scan said line element; photosensitive means disposed outside of said tape for providing a signal responsive to light from said slot as passed by said light aperture; an optical system including a mirror disposed within said tape for directing light from said aperture and slot onto said photosensitive means during each scanning of said line element; said apertures being spaced-apart a distance greater than the length of said slot; a light source disposed outside of said tape and closely spaced to another run thereof, said light source having an aperture in registry with one of said light apertures of said tape when no one of said light apertures is exposed to said slot; and another optical system including another means within said tape for directing light passed by said one aperture from said light source to said photosensitive means for providing a blanking pulse.

10. In a flat copy scanning system for facsimile transmission: means for supporting the copy to be scanned; a first plate arranged on one side of the copy and having an elongated slot formed therein for exposing a transverse line element of said copy; a light source arranged to direct light onto said line element so that said light is reflected through said slot; an endless tape supported on a plurality of rollers, said tape having one run parallel with said line element and spaced therefrom, said tape having a plurality of evenly spaced-apart light apertures arranged on a line therearound; a second plate having an elongated light slot formed therein arranged within said tape and closely spaced from said one run on the side thereof remote from said first plate, said slot being aligned with said line of said light apertures; a lens for focusing the light reflected from said line element onto said line of light apertures in said one run; means for driving at least one of said rollers to move said tape lengthwise of said record plate slot whereby said apertures successively scan the light reflected from said line element; photosensitive means disposed outside of said tape for providing a signal responsive to light from said second plate slot as passed by said light apertures; an optical system including a condensing lens and a first mirror disposed within said tape and a second mirror disposed outside of said tape for directing light from said second plate slot and said light apertures onto said photosensitive means during each scanning of said light reflected from said line element; said apertures being spaced-apart a distance greater than the length of said second plate slot; a second light source disposed outside of said tape and closely spaced to another run thereof, said second light source having an aperture in registry with one of said light apertures of said tape when no one of said light apertures is exposed to said slot; and another optical system including a third mirror within said tape for directing light passed by said one aperture from said second light source onto said second mirror and thence to said photosensitive means for providing a blanking pulse.

11. In a flat copy scanning system for facsimile transmission: means for supporting the copy to be scanned; means for directing light onto a transverse line element of said copy; an endless tape spaced from said copy for receiving light from said line element and having a plurality of evenly spaced-apart light apertures therearound; means having an elongated light slot formed therein arranged on one side of said tape, said slot being aligned with the line of said light apertures; means for moving said tape lengthwise of said slot whereby said apertures successively scan said line element; photosensitive means arranged to receive light from said apertures and slot during each scanning of said line element and to provide a signal in response thereto; said apertures being spaced-apart a distance greater than the length of said slot; a light source disposed on the exterior of said tape and remote from said slot, said light source having an aperture in registry with one of said light apertures of said tape when no one of said light apertures is exposed to said slot; and means for directing light passed by said one aperture from said light source to said photosensitive means for providing a blanking pulse; said light source aperture having the same width as the difference between the spacing of said light apertures on said tape and the length of said slot.

References Cited in the file of this patent

UNITED STATES PATENTS 1,648,687 Hoxie ................ Nov. 8, 1927